(12) United States Patent
Yao (10) Patent No.: US 6,727,665 B2
(45) Date of Patent: Apr. 27, 2004

(54) DIMMER FOR ENERGY SAVING LAMP

(75) Inventor: Xiao Li Yao, Shenzhen (CN)

(73) Assignee: Star Bright Technology Limited, Hong Kong (HK)

( * ) Notice: Subject to any disclaimer, the term of this patent is extended or adjusted under 35 U.S.C. 154(b) by 0 days.

(21) Appl. No.: 10/156,784

(22) Filed: May 30, 2002

(65) Prior Publication Data

US 2003/0222604 A1 Dec. 4, 2003

(51) Int. Cl.[7] .......................... H05B 41/16; H05B 37/02
(52) U.S. Cl. ..................... 315/247; 315/290 R; 315/307
(58) Field of Search .................................. 315/307, 291, 315/209 R, 200 R, 219, 221, 224, 279, 308, 247, DIG. 4, DIG. 5, DIG. 7

(56) References Cited

U.S. PATENT DOCUMENTS

| | | | | |
|---|---|---|---|---|
| 4,894,587 A | * | 1/1990 | Jungreis et al. ......... | 315/200 R |
| 5,402,331 A | * | 3/1995 | Takahashi et al. ............ | 363/89 |
| 5,471,117 A | * | 11/1995 | Ranganath et al. ......... | 315/247 |
| 6,222,325 B1 | * | 4/2001 | Wuidart et al. ......... | 315/209 R |

FOREIGN PATENT DOCUMENTS

| | | |
|---|---|---|
| WO | WO 95/12157 | 5/1995 |
| WO | WO 00/70420 | 11/2000 |
| WO | WO 01/86797 | 11/2001 |

OTHER PUBLICATIONS

Oliveira et al., A Proposed of an AC/AC Serial Regulator Using a Capacitor As the Serial Component, IEEE APEC 2000, Feb. 2000., vol. 2, pp. 875–879.

* cited by examiner

Primary Examiner—James Clinger
Assistant Examiner—Chuc Tran
(74) Attorney, Agent, or Firm—Burns, Doane, Swecker & Mathis, L.L.P.

(57) ABSTRACT

A dimmer for a compact fluorescent lamp including a high-frequency switching circuit for generating PWM or other similar control signals and a filter with simple filtering elements. The dimmer circuitry is simple and can be built on a wall-mountable housing for retro-fitting even in an existing two-wire wall-socket.

20 Claims, 8 Drawing Sheets

DIMMER FOR ENERGY SAVING LAMP

FIELD OF INVENTION

The present invention relates to circuits, devices and apparatuses for dimming electrical lighting. More particularly, this invention relates to dimming circuits, devices and apparatuses for use with energy saving lamps or compact fluorescent lamps.

BACKGROUND OF THE INVENTION

Compact fluorescent lamps, more commonly known as energy saving lamps, are widely used nowadays because of the many advantages including a high power efficiency and a long operating life.

It is well known that fluorescent lamps appear as a variable or non-linear load to a power supply depending on the lamp operating modes. In order to supply an appropriate amount of current for proper lamp operation regardless of the instantaneous operating mode, a ballast is always provided between the main power supply and the fluorescent lamp. In general, a ballast must provide a required high starting voltage and current as well as limiting the current which can pass through the lamp during steady-state operation.

In many occasions, it is desirable to be able to dim the electric lightings. However, dimming of fluorescent lamps has been historically difficult and requires complicated circuit arrangements and topologies. A typical type of dimmer for fluorescent lamps is provided by periodically blocking the supply voltage to the light source by clipping a portion of the AC sinusoidal by reference to the phase angle of the AC power light input. These dimmers are commonly referred to as "phase control dimmers" which can be a forward phase dimmer or a reverse phase dimmer. A forward phase dimmer usually utilizes a thyristor, such as a silicon controlled rectifier (SCR) or, more commonly, a triac as an electronic blocking device or switch. On the other hand, a reverse phase dimmer allows the passage of the portion of the half-cycle of the AC line input immediately after the zero crossing of the AC line and blocks the portion of the half-cycle before the zero-crossing. In both types, the portion or angle of the half-cycle which is to be blocked is adjustable to control dimming. A major shortcoming of this phase control dimmers is that zero crossing detection is a pre-requisite of operation.

However, in circumstances in which the detection of zero crossing is difficult, for example, in the case of a fluorescent lamp with an electronic capacitive ballast, such phase control dimmers will not be suitable. Furthermore, because of the difficulty in dimming fluorescent lamps, most commercially available dimmable fluorescent lamps have the dimmer integrated with the ballast which means remote dimming of conventional fluorescent lamps with integrated electronic ballasts at remote switching locations such as wall-mounted switches is not possible. Hence, it would be highly desirable if there can be provided a simple dimmer or dimmer circuit which can be remotely installed from a compact fluorescent lamp so that dimming of the lamps can be controlled at locations remote from the lamps. In order that the dimmers can be installed at locations reserved for, or already installed with, conventional standard wall sockets, it would be highly desirable if the dimming circuitry is simple enough to be received within a confined space commonly allowed for a standard wall socket. Furthermore, it will be highly desirable if there can be provided a two-wire dimmer for a compact fluorescent lamp so that the dimmer can be retro-fittable without the need of additional wiring.

OBJECT OF THE INVENTION

It is therefore an object of the present invention to provide improved circuits, devices and apparatuses for dimming a fluorescent lamp, especially a compact fluorescent lamp or an energy saving lamp. In particular, it will be an object of the present invention to provide simple dimmers for use with a compact fluorescent lamp which can be remotely located from the fluorescent lamp. It is also another object of the present invention to provide simple circuitry which can be utilized to dim a compact fluorescent lamp without the need of zero-crossing detection of the AC input line to alleviate the complicated circuitry required for such detection. Furthermore, it is an object of the present invention to provide a two-wire dimmer for a fluorescent lamp or the like. It is a least an object of the present invention to provide the public with the choice of a dimmer which can be used with a fluorescent lamp, such as compact fluorescent lamp or an energy saving lamp.

SUMMARY OF THE INVENTION

According to a first aspect of the present invention, there is provided a dimming device including an input terminal for connecting to an alternate current power supply, an output terminal for connecting to a load, and a switched mode power supply wherein said switched mode power supply includes an electronic switching means with first and second switch terminals, switching control means, inductive means and capacitive means, said inductive means being generally connected in series with said switching terminals of said switching means and said capacitive means being connected generally in parallel with the series connection including said switching device and said inductive means and wherein the switching frequency of said electronic switching means is controllable and variable by said switching control means.

According to a second aspect of the present invention, there is provided a two-terminal dimming device for a compact fluorescent lamp including a switched mode power supply which includes rectifying means, electronic switching means, an inductive member, a capacitive member and a switching control means, said rectifying means is connected to said switching means via said inductive member, said capacitive member is connected generally in parallel to the series connection of said inductive member and said switching means, and said switching control means provides switching signals to said switching means, the frequency of said switching signals is substantially higher than that of the input power.

According to a third aspect of the present invention, there is provided a dimming device including an input terminal for connecting to an alternate current power supply, an output terminal for connecting to a load, and a switched mode power supply arrangement, said switched mode power supply includes an electronic switching means with first and second switch terminals, switching control means, an inductor and a capacitor, said first and second terminals of said electronic switching means, said inductor and said capacitor being arranged in a circuit loop, wherein the switching frequency of said electronic switching means is controllable and variable by said switching control means.

Preferably, an inductor is connected between the output of said switched mode power supply and said output terminal of said dimming device.

Preferably, said switching frequency of said electronic switching means is substantially higher than that of the frequency of said alternate current power supply.

Preferably, switching control means include a microcontroller or micro-processor sending out pulse-width modulated (PWM) switching signals.

Preferably, said switching frequency of said switching means is between 1 kHz and 50 kHz.

Preferably, wherein said electronic switching device can be a bipolar transistor, a MOSFET or an IGBT.

Preferably, said inductive means include an inductor and said capacitive means include a capacitor.

Preferably, further including rectifying means for providing rectified power supply to said switching means.

Preferably, an additional inductive member is connected at the output of said device.

Preferably, said series connection of said switching device and said inductive means is further connected in series with a rectifying means, said capacitive means being connected in parallel with the series connection of said switching device, said inductive means and said rectifying means.

Preferably, said switching signals include a pulse train of signals with levels corresponding to "ON" or "OFF" switching states and that the relative duration of the "ON" and "OFF" pulses can be gradually varied.

Preferably, said series connection of said switching device and said inductive means is further connected in series with a rectifying means, said capacitive means being connected in parallel with the series connection of said switching device, said inductive means and said rectifying means.

Preferably, one terminal of the dimming device is for connecting to the AC mains and the other terminal is for connecting to the electronic ballast of a compact fluorescent lamp.

According to a third aspect of the present invention, there is provided a lighting system including the above-mentioned dimming device and a compact fluorescent lamp.

Preferably, the position of said dimming device is independent of that of said compact fluorescent lamp.

According to a fourth aspect of the present invention, there is provided a lighting arrangement including a compact fluorescent lamp with an electronic ballast and a dimming device of the above characteristics.

BRIEF DESCRIPTION OF THE DRAWINGS

Preferred embodiments of the present invention will be explained in further detail by way of examples and with reference to the accompanying drawings in which.

DETAILED DESCRIPTION OF THE PREFERRED EMBODIMENTS

Figure 1:
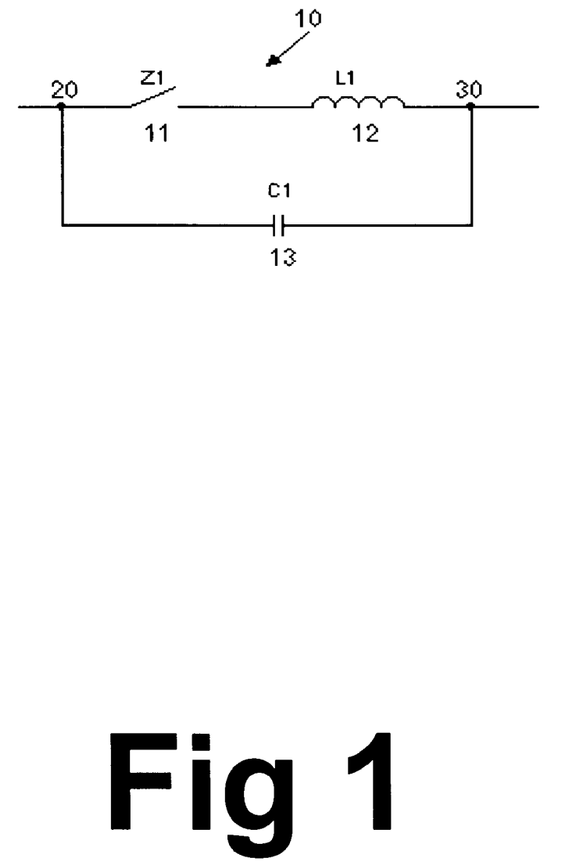
FIG. 1 is a simplified schematic circuit diagram showing the general arrangement of an embodiment of a basic schematic building block of a switching or switched-mode power supply of the dimming circuitry of the present invention.

To assist in understanding of the present invention, a basic schematic building block of a switching or switched-mode power supply for the dimmer circuitry of the present invention is shown in FIG. 1. This basic schematic building block 10 includes a controllable electronic switch 11 which is connected in series with inductive means 12 such as an inductor L1. A capacitive means 13 such as a capacitor C1 is connected in parallel across the series connection of the controllable switch and the inductor. The input node 20 of this circuit connection, which is a node intermediate between the switching device Z1 and the capacitor C1, is for connecting to the input alternate current (AC) power source. The output node of this basic building block, which is the node 30 intermediate between the inductor L1 and the capacitor C1, is for connecting to the electronic ballast of a compact fluorescent lamp or other similar fluorescent lamps, although it will become clear in the description below that an inductive means will be inserted between the output node and the input of the electronic ballast.

Figure 2:
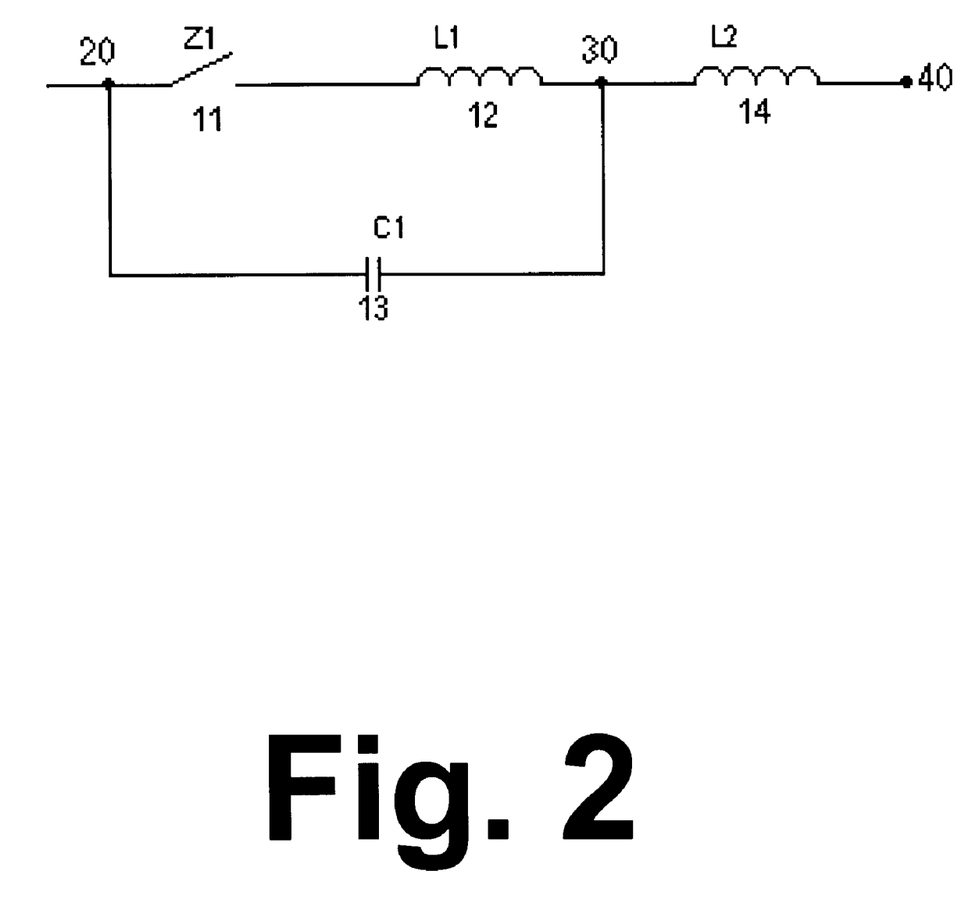
FIG. 2 is a simplified schematic diagram showing the general concept of a first embodiment of a dimming circuitry of the present invention.

Referring to FIG. 2 in which a first embodiment of a schematic dimming block of the present invention is shown, the dimming circuit arrangement includes the switching or switched-mode power supply building block of FIG. 1 plus an additional inductor L2 which is connected at the output node 30 of the basic building block of FIG. 1. This additional inductor L2 is intended to be connected between the output of the switching power supply and the input of the electronic ballast of a compact fluorescent lamp. The value of inductance of this additional inductor L2 (14) is largely dependent on the impedance of the capacitive electronic ballast at the operating chopping frequency and is usually larger than that of L1. The output node of the dimming block is designated with the numeral 40.

Figure 3:
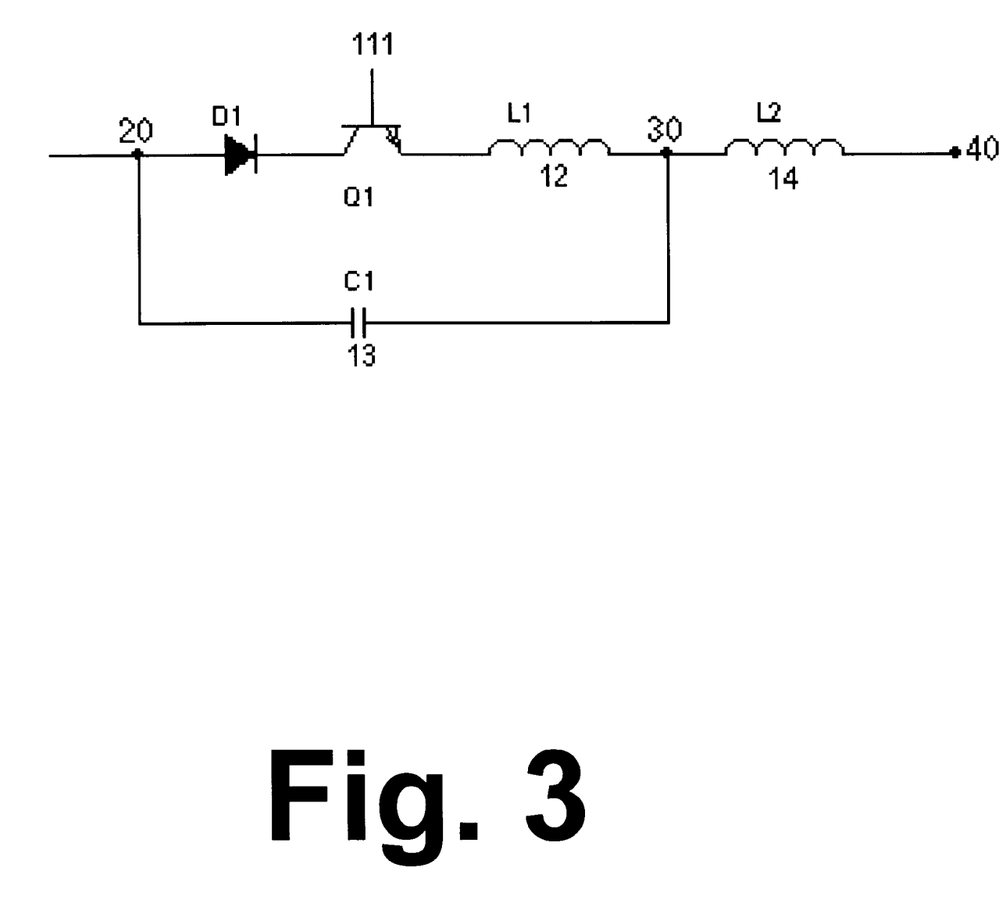
FIG. 3 is a simplified schematic diagram showing a second embodiment of the dimming circuitry of the present invention.

Referring to FIG. 3 in which a second embodiment of the present invention is shown, a bipolar transistor Q1 (111) is inserted in the place of the switching device of FIGS. 1 and 2 as an example of a switching device and a uni-directional current limiting device, which is a diode D1 in the present case, is connected in series between the bipolar transistor 111 and the input node. This diode is added to protect the transistor from damage due to reverse biasing and may be inserted between the transistor Q1 (111) and the inductor L1 (12).

Figure 4:
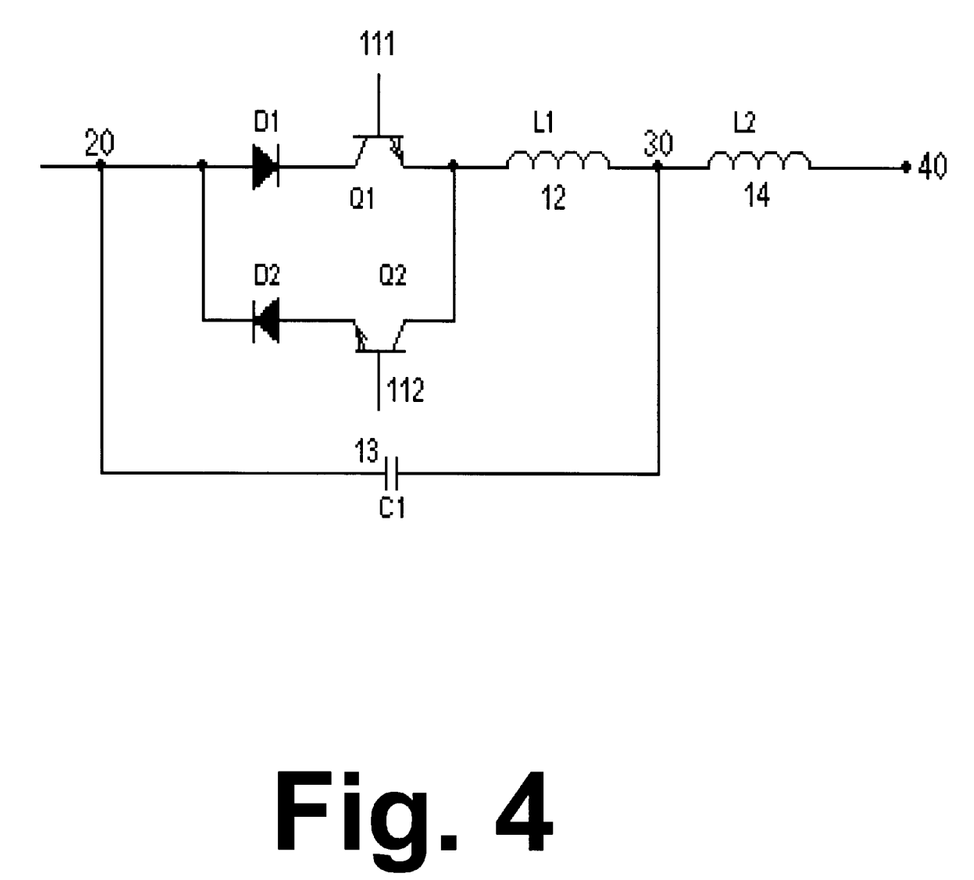
FIG. 4 is a simplified schematic circuit diagram showing a third embodiment of the dimming circuitry of the present invention.

Referring to FIG. 4 in which a third embodiment of the dimming circuitry of the present invention is shown, it will be noted that this circuit connection is generally identical to that of FIG. 3 except that a second pair of a bipolar transistor Q2 (112) and a diode D2 is connected in parallel across the first pair of series connection of the first transistor Q1 (111) and diode D1. It will be noted that the allowable current flowing directions in the first and second transistor diode pairs are generally opposite.

Figure 5:
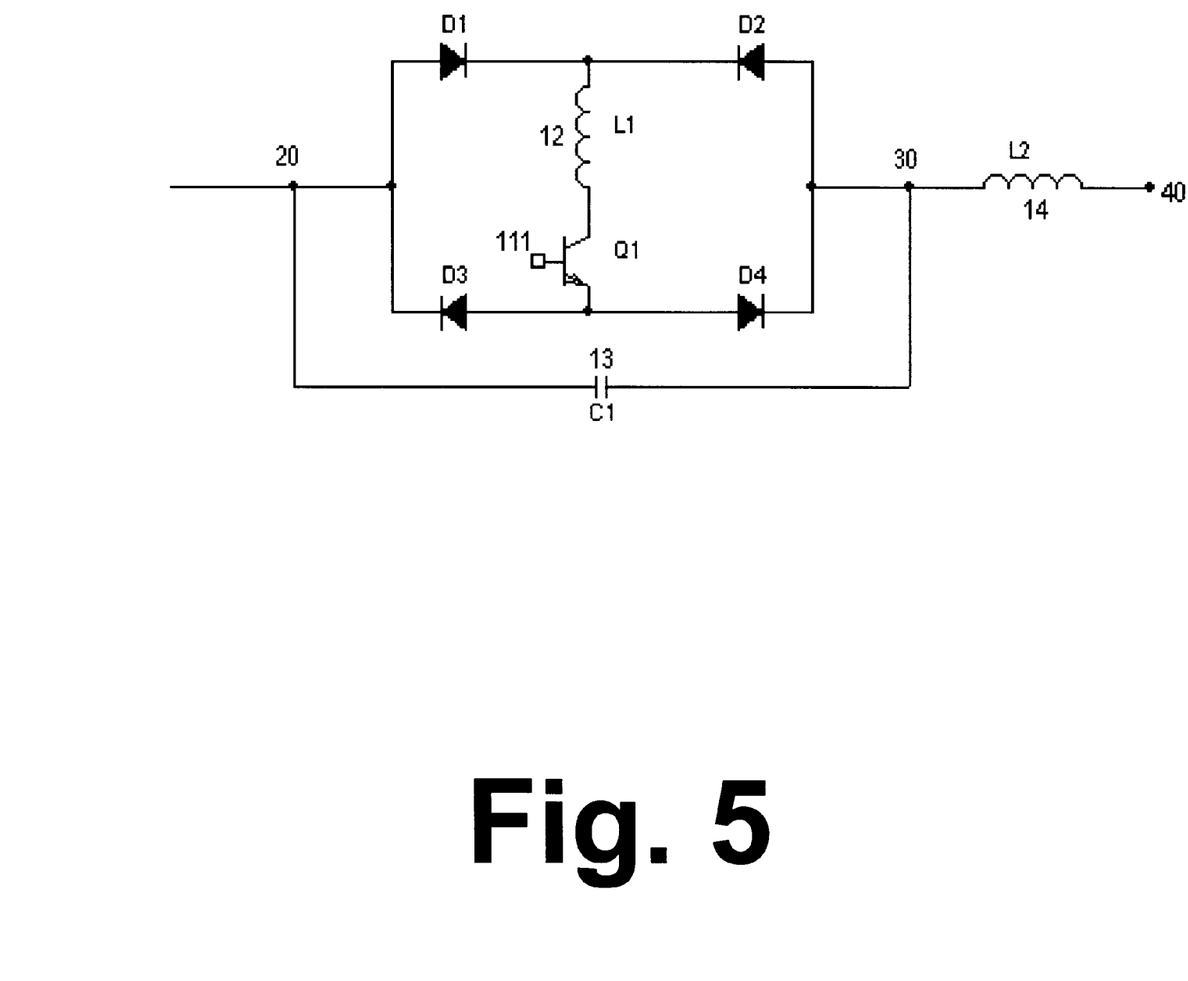
FIG. 5 is a simplified schematic circuit diagram showing a fourth embodiment of the dimming circuitry of the present invention.

Referring to FIG. 5, a fourth embodiment of the dimming circuitry of the present invention is shown. In its embodiment, the series combination of the inductor L1 (12) and the switching device Q1 (111) as shown in FIG. 1 is embedded into a rectifying circuitry so that, when the input node of the dimming circuitry is connected to AC source, the switching device (111), which is a bipolar transistor Q1 (111) in this embodiment, is supplied with full-wave rectified power during full cycles of the AC sinusoidal input. Embodiment 4 is generally similar to embodiment 3 except that a single switching device (111) is used instead of requiring two separate switching devices as in embodiment 4.

Figure 6:
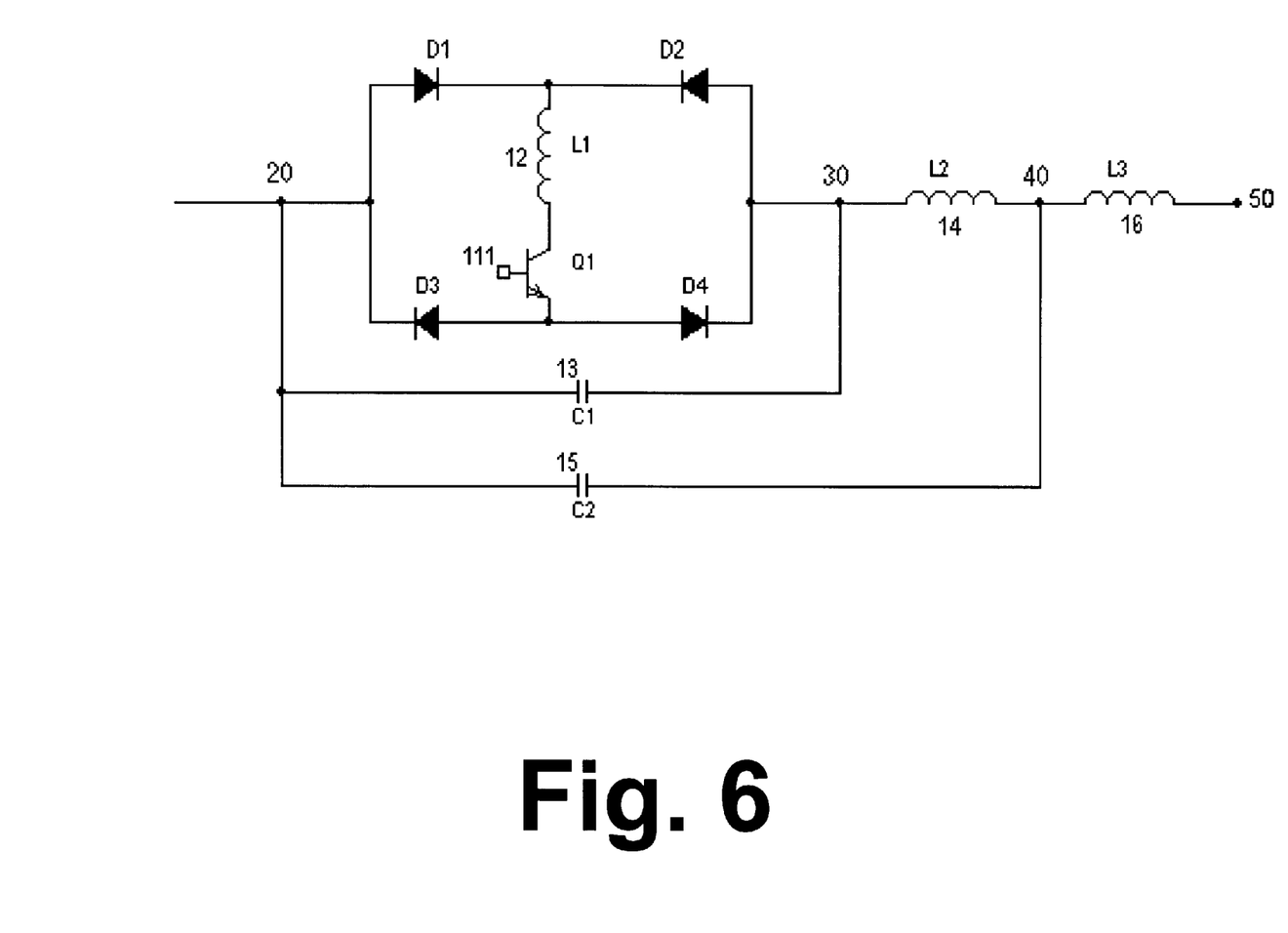
FIG. 6 is a simplified schematic diagram showing a fifth embodiment of the dimming circuitry of the present invention.

A fifth embodiment of the present invention is shown in FIG. 6 in which the embodiment is generally identical to embodiment 4 except that an additional filtering stage including an additional inductor L3 (16) is connected in series with the output inductor L2 (14) and an additional filtering capacitor C2 (15) is branching out from the node 40 between the output inductors L2 and L3 and is then connected to the input node 20 of the dimming circuitry or the input node of the rectifying circuit. The new output node is designated with the numeral 50.

Turning now to the general operating principles of the present invention by referring firstly to the simplified chopping power supply circuit arrangement of FIG. 1, this switching device Z1 is an electronic controllable switching device which can be switchable at frequencies much higher than the AC line frequency of 50–60 Hz. This electronic switching means can be switchable, that is, turned "ON" and "OFF", by a switching signal originating from a switching control means. The switching control means can, for example, be an oscillator or a micro-controller unit which sends out switching control signals, for example, switching pulses of appropriate amplitudes, to the control terminal of the switching device or means. The switching control signals, can be, for example, pulse-width-modulated (PWM) signals with variable switching pulse duration so that the relative duration between adaption ON and OFF pulses can be varied.

By high frequency chopping of a portion of the available power from the AC line during a half cycle of the AC input, part of the AC power supply will be blocked and the power output from the dimming circuitry can be adjustable by varying the relative duration of the ON and OFF pulses. A range of switching frequency suitable for use with compact fluorescent lamps can be in the region of 2 kHz to 50 kHz. Where appropriate, other appropriate frequencies may be suitable for other types of fluorescent lamps.

While it is generally well-known that high frequency variable pulse width chopping, or more commonly known as pulse-width-modulation (PWM), of an AC source can be utilized to vary the amount of power output from the AC source, the direct application of high frequency chopping of the AC source on a compact fluorescent lamp with a capacitive electronic ballast does not work satisfactory. It is known that the impedance of a capacitive load decreases when the frequency increases and a high frequency input current may damage the capacitive load and the more sensitive components.

A dimmer is generally used for a compact fluorescent lamp which includes an electronic ballast at its power input and the electronic ballast is essentially a capacitive load usually designed for use with a low frequency power source such as the 50 or 60 Hz mains supply. When this capacitive load is connected to a high frequency power source, for example, a switched mode power supply, such as a PWM power supply, with a chopping frequency in the kHz range, the impedance of this capacitive load will be substantially lowered and a damaging surge current may flow into the capacitive electronic ballast.

In order to limit the surge current that can flow into the electronic ballast, an inductor or an inductive means is connected between the output of the high frequency chopped power source and the input of the electronic ballast of the compact fluorescent lamp. This inductive means will suppress the high frequency component of the chopped power signal so that only an acceptable level of the adverse high frequency current can flow into the capacitive load.

On the other hand, the inclusion of the inductive means will bring about a high voltage surge (Ldi/dt) which will appear across the terminals of the switching device when the switching device is switched from the "ON" state to the "OFF" state. To overcome this voltage surge problem, a capacitive means can be connected across the terminals of the switching device to provide a lower impedance shunt or by-pass to limit the maximum voltage surge. On the other hand, the addition of this voltage surge protection capacitor may in turn result in a large discharge current in the loop comprising the capacitor and the switching device when the switching device is initially closed. This discharge current may damage the switching device or can cause breakdown of the electronic switching device. To alleviate this problem, an inductive means is connected in series with the switching device to limit the maximum discharge current that can flow in the loop now comprising the switching means, the capacitor and the switching device protecting inductor.

In general, it will be noted that the inductance value of the inductor (L2 or 14 in the Figures) which is connected between the dimmer power output and the ballast input (node 40) is dependent on the impedance of the capacitive electronic ballast at the chopping frequency of the dimmer power output. The capacitive value of the shunting or by-passing capacitor (C1 or 13 in the Figures) is dependent on the value of output inductor (L2 or 14 in the Figures) and the chopping frequency. The inductive value of the inductor in the switching device-capacitor C1 loop will depend on the value of C1 and the current limit of the switching device (Z1 or 11 in the Figures).

It will be appreciated that in the embodiments of FIGS. 2 to 7, the components L1, L2 and C1 are arranged in the form of a "T"-filter including a pair of serially connected inductors and a branched connection of a capacitor. Such an arrangement alleviates the adverse effects of the high frequency chopped power input on the capacitive load as well as protecting the switching device Z1.

Hence, it will be appreciated that the long well-known problem of applying high frequency PWM power to a compact fluorescent lamp can be alleviated by utilizing a switching device in connection with three simple passive components L1, L2 and C1. These three simple components are arranged in a simple three-component "T" shaped form which can be easily accommodated within a confined space. Also, it will be understood that the symbol Z1 used in FIGS. 1 and 2 is merely used to illustrate an electronic switching device. In actual applications, the switching device will be an electronic switching device capable of high frequency switching between, for example, 1 to 50 kHz. Suitable electronic switching means satisfying this requirement include bipolar transistors, field effect transistors (FETs), MOSFETs or insulated gate bipolar transistors (IGBTs).

Referring now to FIG. 3 in which the circuit arrangement is generally identical to that shown in FIG. 2 except that the switching means is replaced by a diode D1 and a bipolar transistor Q1. The bipolar transistor is provided as an example of a suitable high frequency switching device and the serially connected diode is included to protect the bipolar transistor from damage due to reverse biasing.

The embodiment shown in FIG. 4 is generally identical to that shown in FIG. 3 except that an additional pair of transistor Q2 and protective diode D2 is provided so that pulse-width modulation switching can occur during the positive and negative cycles of the AC line source. By allowing pulse-width modulation during the full cycle of the AC line source, a wider range of power adjustment can be achieved.

To achieve the effect of the embodiment of FIG. 4 while minimizing the number of switching devices and therefore the associated control, the two pairs of switching devices in embodiment 3 are replaced by a full wave rectifier together with a series connection of an inductor L1 and a switching means Q1. This series connection of an inductor L1 and a switching means 111 forms a conducting part in both the forward and reverse paths of the rectifying means.

The fifth embodiment illustrates the possible use of an additional filter stage including a further serially connected inductor and a shunt connected capacitor to further protect the capacitive load while allowing high frequency chopping of the input AC source. It will be noted that by including additional filtering stages, the filtering characteristics can be better controlled and the values of the reactive elements can be reduced.

Figure 7:
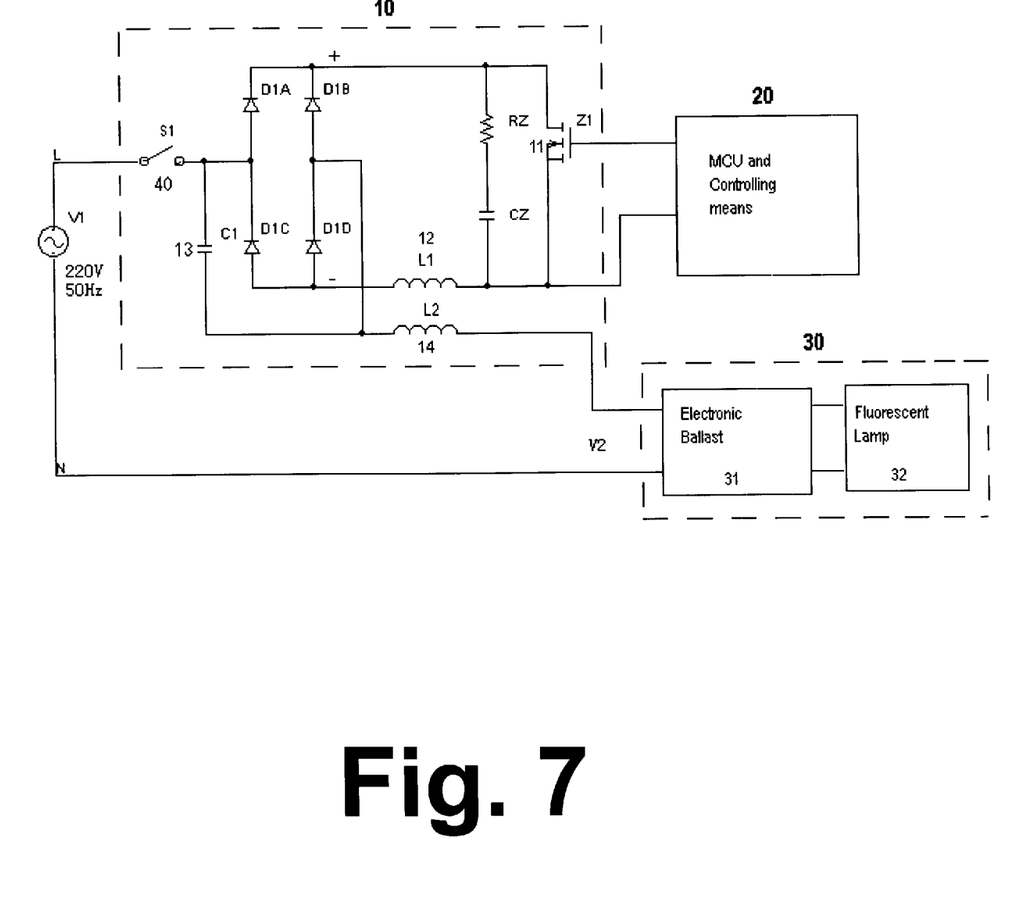
FIG. 7 is a simplified schematic diagram showing a circuit including a dimmer of the fourth embodiment of the present invention utilising a MOSFET, instead of a bipolar transistor, as a switching control means and an energy saving lamp.

The system drawing of FIG. 7 illustrates an AC source, a dimmer circuit 10 similar to the fourth embodiment of the present invention with the switching device 11 controlled by a micro-controller as well as a compact fluorescent lamp 30 with an electronic ballast 31 and a fluorescent tube 32. A main power switch S1 (40) is also illustrated to indicate the switching on and off of the main power to the compact fluorescent lamp 30. When the main power supply to the compact fluorescent lamp 30 has been turned on, the luminous level of the compact fluorescent lamp can be controlled by the micro-controller by sending PWM switching controlling signals to the switching device Z1. By varying the relative duration of the ON and OFF pulses of the PWM signal, the power output that can be supplied to the electronic ballast can be adjusted. By gradually varying the duty cycle, i.e., the ratio between the duration of the ON cycle to the OFF cycle of the PWM pulses, dimming can be gradually effected. It will be noted that a MOSFET is used as the switching device in the present examples.

A series connection of a capacitor CZ (18) and a resistor RZ (17) is further connected in parallel across the terminals of the switching device Z1 in order to protect the switching device from damage due to high voltage surge as a result of high frequency switching at its control terminals.

Figure 8:
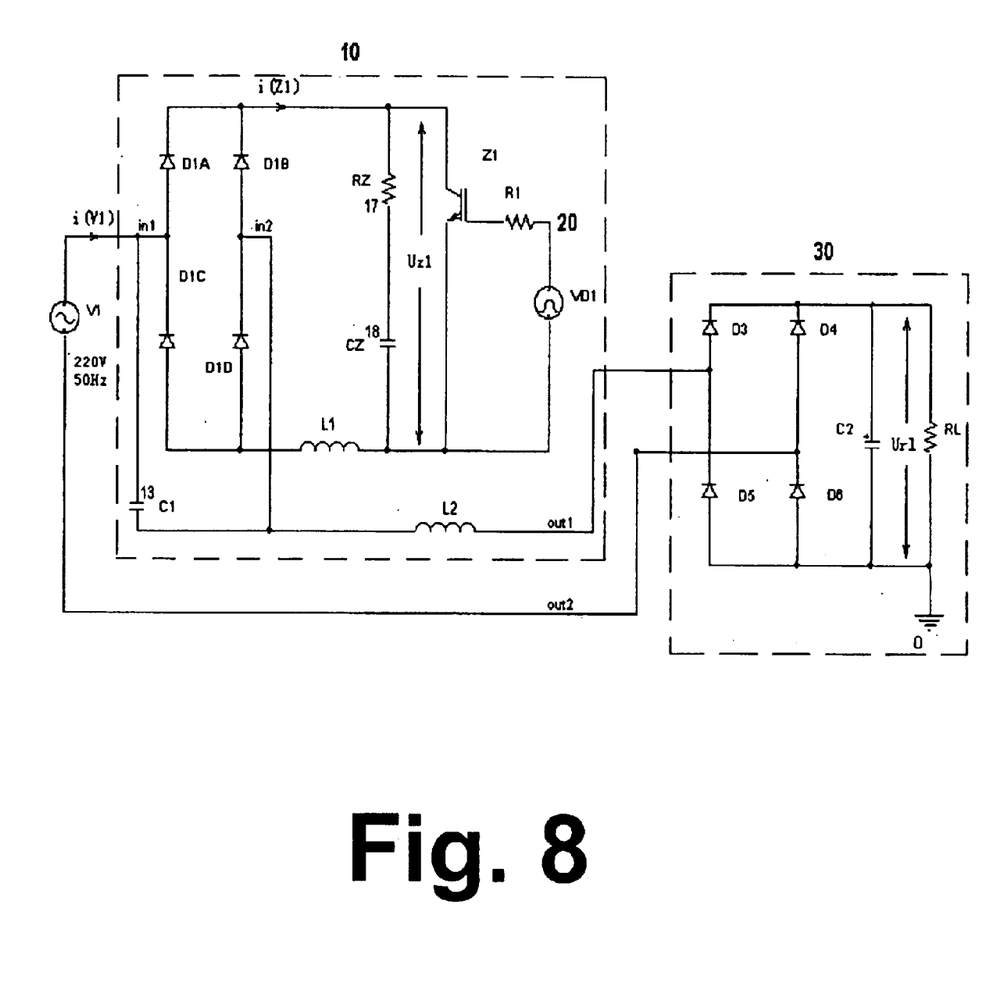
FIG. 8 is a simplified schematic diagram showing the embodiment of FIG. 7 with an equivalent circuit representing free energy saving lamp and equivalent oscillating circuit representing the switching control.

A simplified equivalent circuit of the arrangement of FIG. 7 is shown in FIG. 8, although an IGBT is used as an example of this switching device in this figure. In this figure, the energy saving lamp including the electronic ballast is illustrated in equivalent form as including a parallel connection of a capacitor and a resistor together with a rectifying bridge. It will become apparent from this capacitive equivalent circuit of the compact fluorescent lamp the various problems that have to be overcome in order to achieve a simple and versatile dimming device.

The tables below set out examples of some component values for reference.

EXAMPLE 1

22W Energy Saving Lamp
Z1: MOSFET 900V/8 A
Rz=25Ω Cz=1,000 pF

| Switching Frequency | L1 | L2 | C1 |
| --- | --- | --- | --- |
| 20 kHz | 2 mH | 100 μH | 0.015 μF |
| 5 kHz | 3 mH | 120 μH | 0.022 μH |

EXAMPLE 2

44 W Energy Saving Lamp

| Switching Frequency | L1 | L2 | C1 |
| --- | --- | --- | --- |
| 20 kHz | 2.5 mH | 110 μH | 0.02 μF |

On the other hand, if other conditions remain, the value of the reactive components can be lower by increasing the number of filtering stages.

From the embodiments described above, it will be clear that a dimming circuit suitable for use with a compact fluorescent lamp can be achieved by simple connection of a small number of electronic components. These components, including the switching control signal which is, for example, a single chip micro-processor generating by co-processor, can be accommodated in a very confined space such as the size of a conventional wall socket. With this simple and versatile design, wall-mountable dimmers can be installed in wall sockets replacing conventional "ON" and "OFF" only switches for dimming and switching of energy saving lamps and other fluorescent lamps using electronic ballast.

For example, the dimming circuit including the switching device, the rectifying means, the passive filtering elements and the switching signal generating CPU or MCU can all be mounted on a single wall-mount housing with an input terminal and an output terminal suitable for retrofitting in existing wall sockets.

As an example of a possible modification or variation from the above-described embodiments, it will be appreciated that a dimmer switch may include the basic switching power supply building block of FIG. 1 while the output inductor L2 is connected as a part of the fluorescent lamp and immediately before the input of the electronic ballast.

In general, it will be appreciated that the dimming circuitry of the present invention includes a switched mode power supply circuit which includes a controllable switching means (Z1) with a first and a second switching terminal, a capacitor C1 and an inductor (L1), which are included in a circuit loop. The capacitor C1 and the inductor L1 are for protecting the switching means respectively from voltage and current surges.

While the present invention has been explained by reference to the preferred embodiments described above, it will be appreciated that the embodiments are only examples provided to illustrate the present invention and are not meant to be restrictive on the scope and spirit of the present invention. The scope and ambit of this invention should be determined from the general principles and spirit of the invention as described above. In particular, variations or modifications which are obvious or trivial to persons skilled in the art, as well as improvements made on the basis of the present invention, should be considered as falling within the scope and boundary of the present invention. Furthermore, while the present invention has been explained by reference to compact fluorescent lamps, it should be appreciated that the invention can apply, whether with or without modification, to fluorescent lamps.

Reference Number List

10 dimmer block
11 electronic switch
30 Output node of switched power supply
40 Output node of dimmer C1 capacitor
C2 filtering capacitor
D1 diode
D2 diode
L1 inductor
L2 additional inductor
L3 additional inductor
Q1 bipolar transistor
Q2 bipolar transistor
S1 main power switch
Z1 switching device

What is claimed is:

1. A dimming device including an input terminal for connecting to an alternate current power supply, an output terminal for connecting to a load, and a switched mode power supply wherein said switched mode power supply includes an electronic switching means with first and second switch terminals, switching control means, inductive means and capacitive means, said inductive means being generally connected in series with said switching terminals of said switching means and said capacitive means being connected generally in parallel with the series connection including said switching device and said inductive means, wherein the switching frequency of said electronic switching means is controllable and variable by said switching control means, and wherein said switching frequency of said switching means is between 1 kHz and 50 kHz.

2. A dimming device including an input terminal for connecting to an alternate current power supply, an output terminal for connecting to a load, and a switched mode power supply wherein said switched mode power supply includes an electronic switching means with first and second switching terminals, switching control means, inductive means and capacitive means, said inductive means being generally connected in series with said switching terminals of said switching means and said capacitive means being connected generally in parallel with the series connection including said switching device and said inductive means, wherein the switching frequency of said electronic switching means is controllable and variable by said switching control means, and wherein said series connection of said switching device and said inductive means is further connected in series with a rectifying means, said capacitive means being connected in parallel with the series connection of said switching device, said inductive means and said rectifying means.

3. A two-terminal dimming device for a compact fluorescent lamp including a switched mode power supply, said switched mode power supply including rectifying means, electronic switching means, an inductive member, a capacitive member and a switching control means, said rectifying means being connected to said switching means via said inductive member, said capacitive member being connected generally in parallel with the series connection of said inductive member and said switching means, and said switching control means providing switching signals to said switching means, the frequency of said switching signals being substantially higher than that of the input power, wherein said series connection of said switching device and said inductive means is further connected in series with a rectifying means, said capacitive means being connected in parallel with the series connection of said switching device, said inductive means and said rectifying means.

4. A two-terminal dimming device for a compact fluorescent lamp including a switched mode power supply, said switched mode power supply including rectifying means, electronic switching means, an inductive member, a capacitive member and a switching control means, said rectifying means being connected to said switching means via said inductive member, said capacitive member being connected generally in parallel with the series connection of said inductive member and said switching means, and said switching control means providing switching signals to said switching means, the frequency of said switching signals being substantially higher than that of the input power.

5. A lighting arrangement including a compact fluorescent lamp with an electronic ballast and a dimming device of claim 4.

6. A lighting system including a dimming device of claim 4 and a compact fluorescent lamp with an electronic ballast, wherein the position of said dimming device is independent of that of said compact fluorescent lamp.

7. A dimming device including an input terminal for connecting to an alternate current power supply, an output terminal for connecting to a load and a switched mode power supply between said input and said output terminals, said switched mode power supply including an electronic switching means with first and second switching terminals, switching control means, first inductive means and first capacitive means, said first inductive means being connected in series with said switching terminals of said switching means and between said output terminal of said dimming device and said switching means, said first capacitive means being generally in parallel with said switching device, the switching frequency of said electronic switching means being controllable and variable by said switching control means, wherein said first inductive means is adapted for limiting surge current at said output terminal of said dimming device due to the switching of said switching means, and said first capacitive means is adapted for limiting surge voltage across said first and second switch terminals of said switching means.

8. A dimming device according to claim 7, further including a second inductive means, said second inductive means being included in a loop containing said first and said second terminals of said switching means and said first capacitive means, said second inductive means being adapted for limiting discharge current in said loop due to said first capacitive means.

9. A dimming device according to claim 8, further including rectifying means, said rectifying means being connected in series with said switching means for converting an alternating current from said alternate current power supply into a direct current flowing in said loop of said switching means.

10. A dimming device according to claim 9, wherein said rectifying means is a full wave rectifier configured to feed unidirectional current into said switching means.

11. A dimming device according to claim 9, wherein said switching frequency of said switching means is between 1 kHz and 50 kHz.

12. A dimming device according to claim 11, wherein said electronic switching device is a bipolar transistor, a MOSFET or an IGBT.

13. A dimming device according to claim 8, further including a second capacitive means and a third inductive means, said second capacitive means being generally connected in parallel with the serial connection of said first capacitive means and said second inductive means, said third inductive means being connected in series with said second inductive means and said output terminal of said dimming device, said second capacitive means and said third inductive being configured as a filtering stage for protecting a capacitive load.

14. A dimming device according to claim 7, wherein said inductive means includes an inductor and said capacitive means includes a capacitor.

15. A dimming device according to claim 7, wherein said switching frequency of said electronic switching means is substantially higher than that of the frequency of said alternate current power supply.

16. A dimming device according to claim 15, wherein said switching control means includes a micro-controller or a micro-processor, said micro-controller or micro-processor sending out pulse-width modulated (PWM) switching signals, said switching signals including a pulse train of signals with levels corresponding to "ON" or "OFF" switching states, and wherein the relative duration of the "ON" and "OFF" pulses can be gradually varied.

17. A lighting arrangement including a compact fluorescent lamp with an electronic ballast and a dimming device of claim 7.

18. A lighting arrangement including compact fluorescent lamp with an electronic ballast and a dimming device of claim 8.

19. A lighting system including a dimming device of claim 7 and a compact fluorescent lamp with an electronic ballast, wherein the position of said dimming device is independent of that of said compact fluorescent lamp.

20. A lighting system including a dimming device of claim 8 and a compact fluorescent lamp with an electronic ballast, wherein the position of said dimming device is independent of that of said compact fluorescent lamp.

* * * * *